(12) United States Patent
Omata et al.

(10) Patent No.: US 11,018,614 B2
(45) Date of Patent: May 25, 2021

(54) DUAL-INVERTER DRIVE APPARATUS FOR SYNCHRONOUS MOTOR

(71) Applicants: DENSO CORPORATION, Kariya (JP); TOYOTA JIDOSHA KABUSHIKI KAISHA, Toyota (JP)

(72) Inventors: Ryuji Omata, Kariya (JP); Kiyotaka Matsubara, Ichinomiya (JP); Makoto Nakamura, Okazaki (JP); Daigo Nobe, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 16/360,642

(22) Filed: Mar. 21, 2019

(65) Prior Publication Data

US 2019/0296678 A1     Sep. 26, 2019

(30) Foreign Application Priority Data

Mar. 22, 2018 (JP) .............................. JP2018-054614

(51) Int. Cl.
*H02P 5/00* (2016.01)
*H02P 27/08* (2006.01)
(Continued)

(52) U.S. Cl.
CPC ........ *H02P 27/08* (2013.01); *H02M 7/53871* (2013.01); *H02P 21/22* (2016.02); *B60L 15/2045* (2013.01)

(58) Field of Classification Search
CPC .. H02M 7/493; H02M 7/53871; H02M 7/003; H02M 2007/4822; H02M 7/49;
(Continued)

(56) References Cited

U.S. PATENT DOCUMENTS

| 7,154,237 B2 * | 12/2006 | Welchko | H02P 27/06 |
| | | | 318/400.27 |
| 2005/0002210 A1 * | 1/2005 | Moon | B60L 15/025 |
| | | | 363/37 |

(Continued)

FOREIGN PATENT DOCUMENTS

| JP | 2000-125411 A | 4/2000 |
| JP | 2000-324871 A | 11/2000 |

(Continued)

*Primary Examiner* — Eduardo Colon Santana
*Assistant Examiner* — Zemenay T Truneh
(74) *Attorney, Agent, or Firm* — Oliff PLC

(57) ABSTRACT

In a dual-inverter type of motor control apparatus which controls a synchronous motor having two or more open-end armature windings corresponding to respective phases, first and second inverter control circuits control the motor by supplying voltage commands to corresponding ones of the two inverters, with a combination of respective control methods executed by the inverter control circuits for generating the voltage commands being determined such as to provide a high speed of control response, while preventing control interference caused by effects of component characteristic disparities, such as deviations between timings of updating the voltage commands by the two inverter control circuits.

6 Claims, 13 Drawing Sheets

(51) Int. Cl.
*H02M 7/5387* (2007.01)
*H02P 21/22* (2016.01)
*B60L 15/20* (2006.01)

(58) Field of Classification Search
CPC ..... H02M 11/00; H02P 21/0003; H02P 21/22; H02P 27/08; H02P 29/50; B60L 15/2045
USPC .......................................... 318/400.26, 139
See application file for complete search history.

(56) References Cited

U.S. PATENT DOCUMENTS

| | | | |
|---|---|---|---|
| 2006/0061310 A1* | 3/2006 | Takai | B60L 15/2045 |
| | | | 318/139 |
| 2006/0164028 A1 | 7/2006 | Welchko et al. | |
| 2009/0289497 A1* | 11/2009 | Ichikawa | H01M 10/63 |
| | | | 307/9.1 |
| 2016/0156291 A1* | 6/2016 | Becker | H02M 7/493 |
| | | | 318/400.26 |
| 2017/0294864 A1* | 10/2017 | Tada | H02P 29/50 |
| 2018/0152127 A1* | 5/2018 | Park | H02P 21/12 |

FOREIGN PATENT DOCUMENTS

| | | |
|---|---|---|
| JP | 3352182 B2 | 12/2002 |
| JP | 2017-175700 A | 9/2017 |
| JP | 2019-047670 A | 3/2019 |
| JP | 2019-170149 A | 10/2019 |

\* cited by examiner

FIG.13

| FIRST INVERTER \ SECOND INVERTER | | HIGH SPEED FF | | LOW SPEED FF | | FF | |
|---|---|---|---|---|---|---|---|
| | | ANGLE NON-SYNCHRONIZED | ANGLE SYNCHRONIZED | ANGLE NON-SYNCHRONIZED | ANGLE SYNCHRONIZED | ANGLE NON-SYNCHRONIZED | ANGLE SYNCHRONIZED |
| HIGH SPEED FF | ANGLE NON-SYNCHRONIZED | × | ○ | ○ *2 | ○ | ○ *1 | ○ |
| | ANGLE SYNCHRONIZED | ○ | ○ *5 | ○ | ○ *4 | ○ | ○ *3 |
| LOW SPEED FF | ANGLE NON-SYNCHRONIZED | ○ *2 | ○ | × | ○ | ○ | ○ |
| | ANGLE SYNCHRONIZED | ○ | ○ *4 | ○ | ○ | ○ | ○ |
| FF | ANGLE NON-SYNCHRONIZED | ○ *1 | ○ | ○ | ○ | ○ | ○ |
| | ANGLE SYNCHRONIZED | ○ | ○ *3 | ○ | ○ | ○ | ○ | ns that are used to obtain
DUAL-INVERTER DRIVE APPARATUS FOR SYNCHRONOUS MOTOR

CROSS REFERENCE TO RELATED APPLICATIONS

This application is based on and claims the benefit of priority from Japanese Patent Application 2018-054614 filed on Mar. 22, 2018, and the disclosure of this application is incorporated in its entirety herein by reference.

BACKGROUND OF THE INVENTION

Field of Application

The present invention relates to a dual-inverter type of synchronous motor drive apparatus, and specifically to technology whereby polyphase opposed-polarity AC output voltages from two inverters are applied to drive a synchronous motor, or a synchronous rotary electric machine such as a motor generator that can be operated as a motor.

SUMMARY OF THE INVENTION

A motor drive apparatus according to the present invention is applicable to driving a synchronous motor having two or more armature windings corresponding to respective phases, each armature winding having an open configuration, with a first end and a second end thereof unconnected to the ends of other ones of the armature windings. The motor drive apparatus includes a first inverter having a plurality of first switching elements which are each connected to the first end of a corresponding one of the armature windings, a second inverter having a plurality of second switching elements which are each connected to the second end of a corresponding one of the armature windings, and a control section having a first inverter control circuit and a second inverter control circuit, which control the output voltages of the first inverter and second inverter respectively.

The first inverter control circuit generates voltage control signals for the first inverter, for example based on an externally supplied torque command value, and the second inverter control circuit similarly generates voltage control signals for the second inverter.

The control section determines a combination of respective control methods executed by the first and second inverter control circuits, with the combination being determined such as to prevent control interference.

In each inverter control circuit, the update timings of the voltage commands may be synchronized with the electrical angle of the motor. This is referred to as angle synchronized control in the following. Alternatively, the update timings may be synchronized with a fixed timing reference. This is referred to as angle non-synchronized control in the following.

BRIEF DESCRIPTION OF THE DRAWINGS

FIG. 13 is a matrix diagram showing relationships between combinations of methods of controlling two inverter control circuits and occurrence or non-occurrence of control interference.

DESCRIPTION OF PREFERRED EMBODIMENTS

Figure 1:
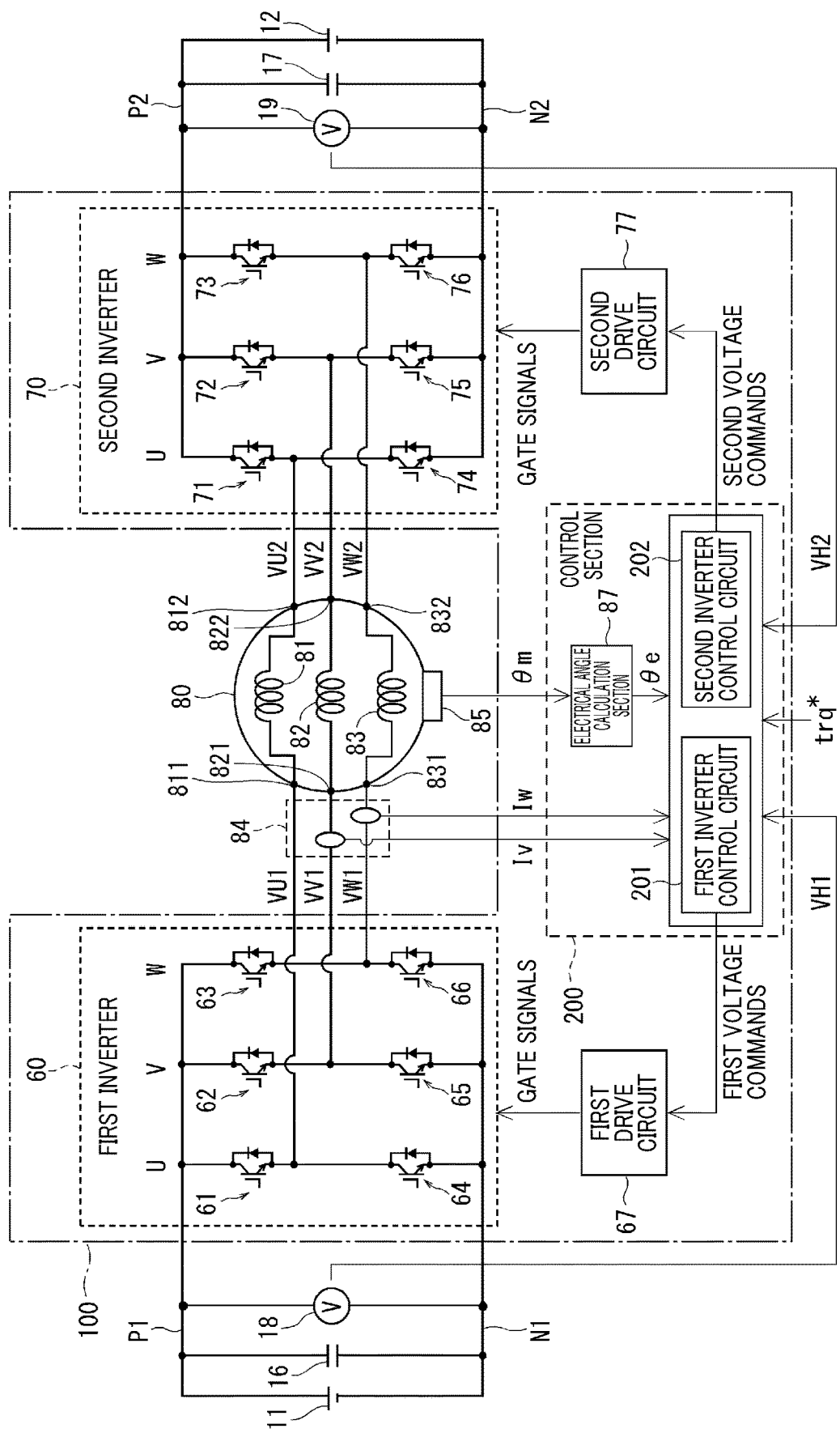
FIG. 1 is a diagram that is applicable for describing each of respective embodiments, showing the overall configuration of a system based on a motor drive apparatus according to the present invention.

Technology for dual-inverter control of a synchronous motor is described for example in Japanese patent publication No. 3352182, designated in the following as reference document 1. With such dual-inverter control, if the inverters are of identical design and the dq-axis vectors of voltage commands (expressing command values of inverter output voltage) produced in respective inverter control circuits of the two inverters are of identical magnitude and mutually opposite polarity, the magnitude of the voltage applied to the armature windings of the motor will be twice the output voltage of one inverter.

Reference document 1 discusses various points such as configurations for performing inversion to make the outputs of the two inverters opposite in polarity, and general concepts concerning PWM (Pulse Width Modulation) based on voltage commands expressing command values of output voltage of the respective inverters. However although examples of applying feedback control to such a dual-inverter motor control apparatus are discussed, there is no concrete description of technical problems that must be avoided for providing a practical apparatus, or of how that is to be achieved.

When controlling two inverters of such a motor drive apparatus, it is necessary to consider the effects of differences between operating characteristics of component parts of the apparatus, such as microcomputers and sensors. If the apparatus is configured using a plurality of microcomputers, the effects of variations between the characteristics of different microcomputers must be taken into consideration. Similarly it is necessary to consider the effects of variations between the characteristics of sensors that are used to obtain feedback information for control circuits. Even if the apparatus employs a single microcomputer and set of sensors, there may be deviations between the values of sensor signals as recognized by different microcomputers.

Depending upon the control methods applied by inverter control circuits of the inverters, there is a danger that control interference will be produced as a result of these factors, or a divergence of torque and/or output voltage may arise. Such factors can result in unstable operation of the motor.

Embodiments of the invention are described in the following referring to the drawings. Elements which appear in a plurality of embodiments are designated by the same symbols throughout. Each of the embodiments is an apparatus that controls the operation of a motor-generator which is a motive power source for a hybrid automobile or an electric automobile. In the following, "motor-generator" is abbreviated to "MG", and "motor-generator control apparatus" to "MG control apparatus". The embodiments are described for the case of the motor-generator being controlled as a motor.

FIG. 1 shows the overall configuration of a system which is of dual power source, dual-inverter form, having two power sources 11, 12 and two inverters 60, 70. The MG 80 is a permanent magnet type of 3-phase synchronous rotary machine, with armature windings (referred to in the following simply as "windings") consisting of a U-phase winding 81, a V-phase winding 82 and W-phase winding 83. When applied to a hybrid vehicle, the MG 80 can be driven as a motor for generating torque to drive the road wheels of the vehicle, or as an electric generator that can be driven by kinetic energy transferred from the vehicle engine or from the road wheels.

The 3-phase windings 81, 82, 83 of the MG 80 are of open-end configuration, with no connection between the end points of each winding and those of the other windings. Each of the end points 811, 821, 831 of the 3-phase windings 81, 82, 83 is connected to a corresponding one of the three phase output terminals of the first inverter 60, while each of the other end points 812, 822, 832 of the 3-phase windings 81, 82, 83 is connected to a corresponding one of the three phase output terminals of the second inverter 70. A rotation angle sensor 85, consisting of a resolver or the like, detects the (mechanical) angle θm to which the MG 80 has rotated. The mechanical angle θm is converted to an electrical angle θe by an electrical angle conversion section 87 of the control section 200.

The first power source 11 and second power source 12 are respectively independent and electrically insulated from one another. Such power sources can consist of rechargeable storage devices such as secondary batteries, exemplified by nickel-hydrogen batteries, lithium cells, etc., or capacitors such as electric dual-layer capacitors, etc. For example, a high output power type of lithium-ion battery, could be used as the first power source 11, and a high storage capacity type of lithium-ion battery could be used as the second power source 12. The two inverters 60, 70 receive DC power respectively separately from the power sources 11 and 12. The first power source 11 can supply or receive power to/from the MG 80 via the first inverter 60, and the second power source 12 can supply or receive power to/from the MG 80 via the second inverter 70.

The MG 80 is supplied with 3-phase AC power from the first power source 11 via the first inverter 60, and from the second power source 12 via the second inverter 70. A U-phase voltage VU1, V-phase voltage VV1 and W-phase voltage VW1 are applied to respective end points of the 3-phase windings 81, 82, 83 at the side of the first inverter 60, while the U-phase voltage VU2, V-phase voltage VV2 and W-phase voltage VW2 are applied to the other end points of the 3-phase windings 81, 82, 83, at the side of the second inverter 70.

Current sensors 84 are provided in the supply path between the MG 80 and the first inverter 60, for obtaining the values of current Iv, Iw in two of the 3-phase windings 81, 82, 83. With this embodiment the values of 3-phase currents Iu, Iv, Iw are calculated based on only two phase currents, however it would be equally possible to employ three current sensors to directly detect these 3-phase current values. Furthermore it would be equally possible to dispose such current sensors in the supply path between the MG 80 and the second inverter 70, or in both of the paths between the MG 80 and the first inverter 60 and second inverter 70 respectively.

A first capacitor 16 is connected between the high-potential side wiring P1 and low-potential side wiring N1, and a second capacitor 17 between the high-potential side wiring P2 and low-potential side wiring N2. A first voltage sensor 18 detects the input voltage VH1 applied from the first power source 11 to the first capacitor 16, while a second voltage sensor 19 detects the input voltage VH2 that is applied from the second power source 12 to the second capacitor 17.

The MG control apparatus 100 is provided with a first inverter 60, a second inverter 70, a control section 200, and first and second drive circuits 67 and 77. The first inverter 60 has six first switching elements 61~66 connected in bridge configuration to the U-phase, V-phase and W-phase windings 81, 82, 83. Upper-arm switching elements 61, 62, 63 respectively correspond to the U, V and W phases, while the lower-arm switching elements 64, 65, 66 similarly correspond to the U, V and W phases respectively.

The second inverter 70 has six first switching elements 71~76 connected in bridge configuration to the U-phase, V-phase and W-phase windings 81, 82, 83. The upper-arm switching elements 71, 72, 73 respectively correspond to the U, V and W phases, and the lower-arm switching elements 74, 75, 76 similarly correspond to the U, V and W phases respectively.

The switching elements 61~66 and 71~77 can be IGBTs (insulated gate bipolar transistors), each connected in parallel with a flyback diode which allows current to flow from the low-potential side to the high-potential side. To prevent short-circuits between the high-potential and low-potential wiring P1, N1 or between the high-potential and low-potential wiring P2, N2, complementary on/off switching of the upper-arm and lower-arm switching elements of each phase is performed, to prevent these switching elements from being set to the on state (conducting state) concurrently.

It will be assumed for example that the functions of the control section 200 of each of respective embodiments of the invention described in the following are implemented using a single microcomputer, having a CPU (Central Processing Unit), RAM, ROM, I/O (Input/Output) interface, etc., that are interconnected via data buses (not shown in the drawings). However it would be equally possible to utilize a plurality of microcomputers. That is to say, functions for controlling the inverters 60 and 70 are implemented by the control section 200 through software processing and hardware processing, where the software processing is performed by the CPU of the microcomputer in executing programs stored beforehand in a readable non-volatile data storage medium such as a ROM, while the hardware processing utilizes dedicated circuitry.

The control section 200 includes a first inverter control circuit 201 and second inverter control circuit 202, and determines respective control methods that are executed by these inverter control circuits, as described hereinafter. Specifically, the control functions performed (through software processing and dedicated hardware circuits as described above) for generating voltage commands to determine the output voltage of a specific inverter, are described in the following description and the appended claims as the "inverter control circuit" of that inverter for ease of understanding.

The first inverter control circuit 201 generates first voltage commands (expressing command values of output voltage) for the first inverter 60 based on an externally supplied torque command trq* (i.e., reference value of torque) and on detection information from the sensors. The second inverter control circuit 202 similarly generates second voltage commands for the second inverter 70, based on the torque command trq* and the detection information. Each of the first and second inverter control circuits 201, 202 receives input values of phase currents Iv, Iw, electrical angle θe, voltages VH1, VH2 of the first and second power sources 11 and 12, etc. The first drive circuit 67 supplies gate signals to the gate electrodes of the switching elements of the first inverter 60, in accordance with the first voltage commands. The second drive circuit 77 similarly outputs gate signals to the second inverter 70 in accordance with the second voltage commands.

Figure 2:
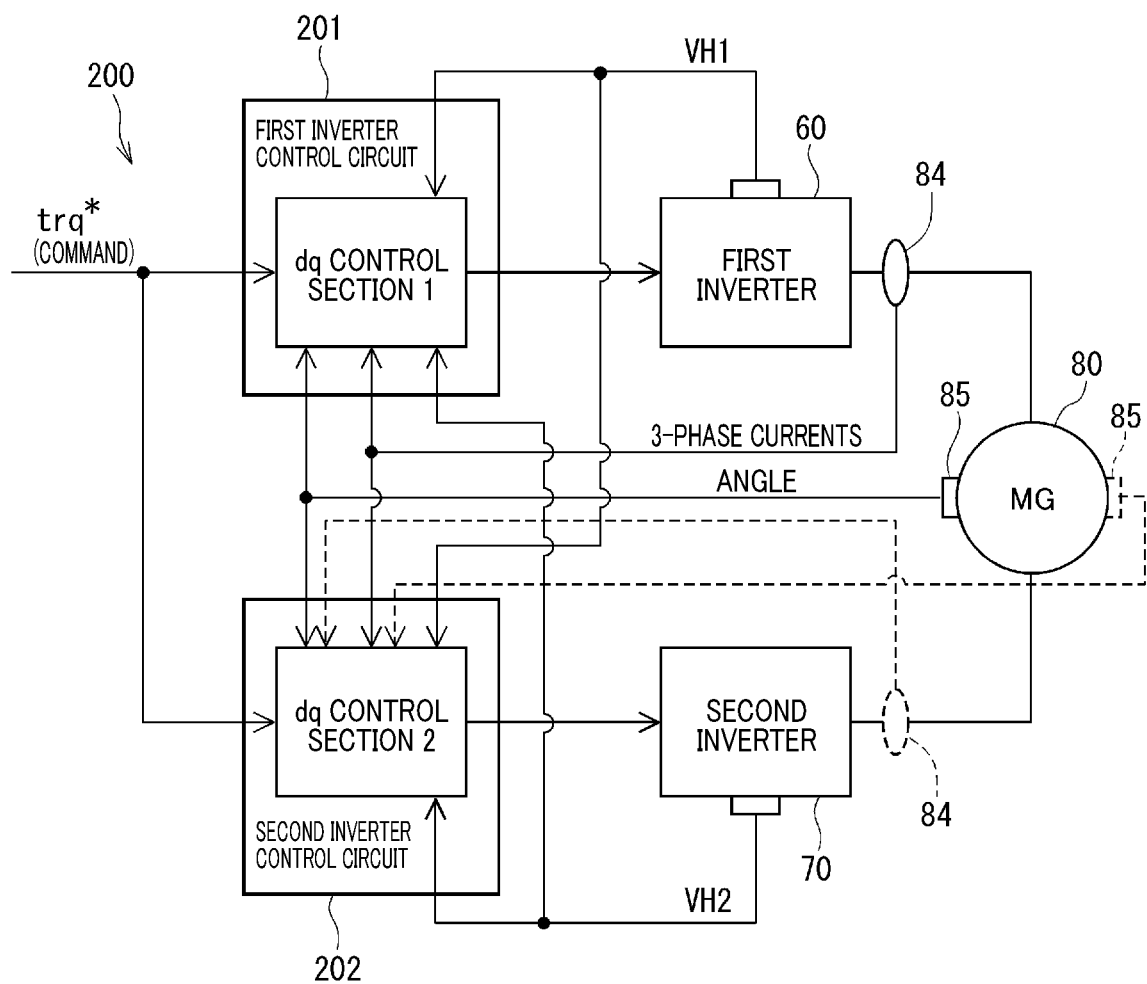
FIG. 2 is a diagram that is applicable for describing each of the embodiments, showing the general configuration of inverter control circuits that are connected to corresponding inverters.

FIG. 2 illustrates the general configuration of the control section 200. In FIG. 2, the designation "INV" signifies "inverter". As described above, the control section 200 may be constituted by a single microcomputer which executes a stored program for implementing the functions of the first inverter control circuit 201 and second inverter control circuit 202, however it would be equally possible for the inverter control circuits 201, 202 to be implemented by respectively separate microcomputers which can mutually communicate. Each of the first and second inverter control circuits 201, 202 generates voltage commands independently of (but coordinated with) voltage commands that are generated by the other inverter control circuit, for controlling the inverters 60 and 70 respectively.

Detected values of angle (mechanical angle θm of the MG 80) and of 3-phase current Iea of the MG 80 are required by both of the first and second inverter control circuits 201, 202, and this information may be provided in common by respective single sensors, i.e., as indicated by the full-line connections shown for the rotation angle sensor 85 and current sensors 84 in FIG. 2. However it would be equally possible to provide separate rotation angle sensors 85 and separate current sensors 85, as indicated by the dashed-line connections in FIG. 2. Coordinate conversion of detected 3-phase current values into dq-axis current values based on the electrical angle θe of the motor, current feedback control, and torque feedback control using an estimated torque value that is calculated based on the dq-axis current values, are well known in the field of motor control, and hence description is omitted herein. Essentially, the inverter control circuits 201 and 202 execute d,q control for respectively generating a first voltage command vector to control the (3-phase) output voltage of the first inverter 60 and a second voltage command vector to control the output voltage of the second inverter 70, based on the value of command torque Trq*, the detected values of phase currents of the MG 80, and the electrical angle of the MG 80.

Figure 3:
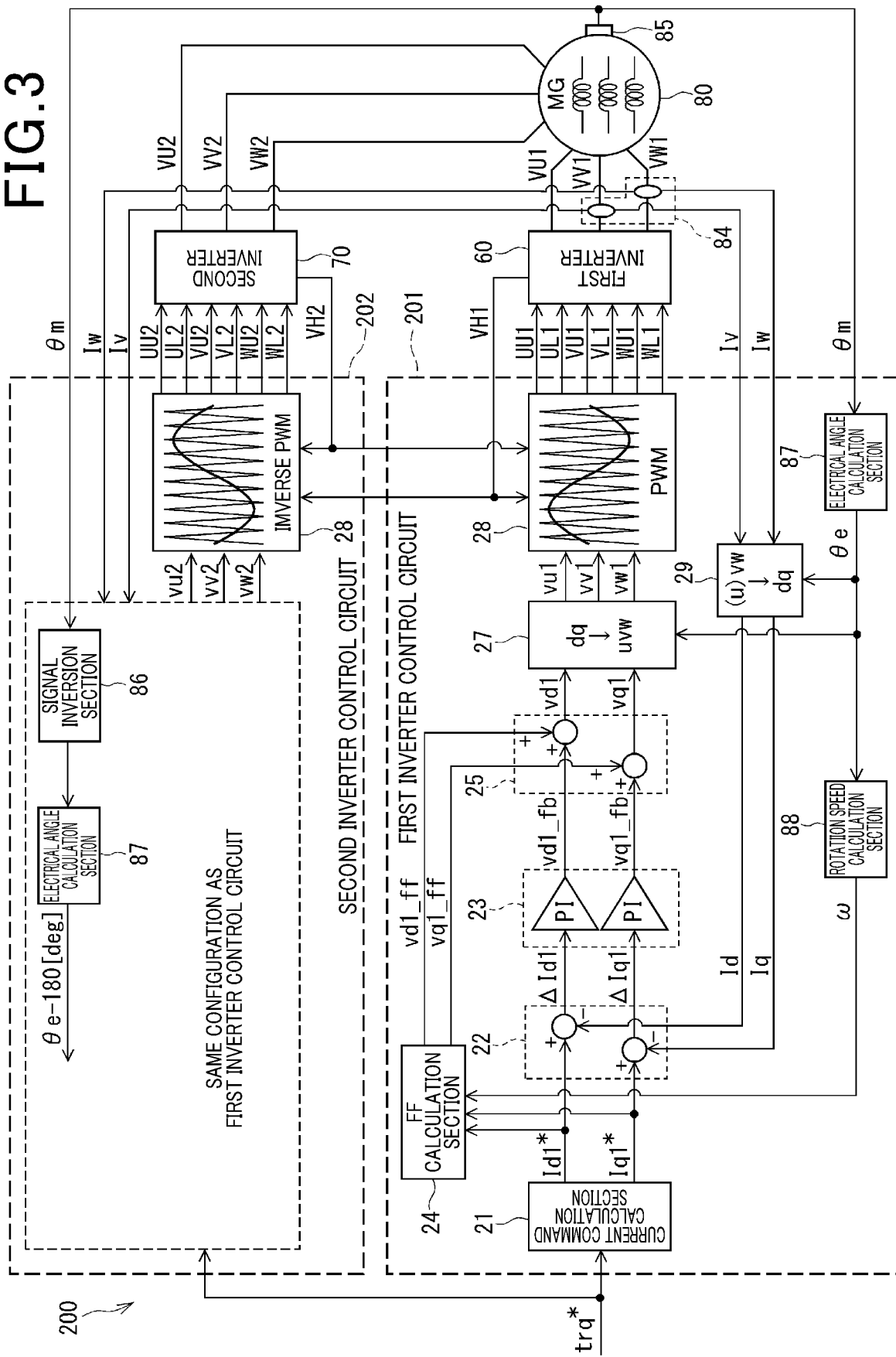
FIG. 3 is a detailed block diagram that is applicable for describing the control sections of each of the embodiments.

FIG. 3 is a block diagram that is applicable to each of the embodiments, showing details of the first and second inverter control circuits 201, 202 in the control section 200.

The following description will be centered mainly on the first inverter control circuit 201, which includes a current command calculation section 21, a current subtractor section 22, a PI (Proportional Integral) controller 23, a feedforward calculation section 24, a voltage command summing section 25, a 3-phase AC conversion section 27, a modulator 28 and a dq conversion section 29.

An electrical angle calculation section 87 converts the mechanical angle θm of the MG 80, detected by the rotation angle sensor 85, to the electrical angle θe. A rotation speed calculation section 88 converts the electrical angle θe to a rotation speed w, by differentiating the electrical angle θe with respect to time to obtain an electrical angular velocity and multiplying the angular velocity by a coefficient. It would be equally possible for the electrical angle calculation section 87 and rotation speed calculation section 88 to be provided separately from the first inverter control circuit 201. In FIG. 3, values used in the inverter control circuits 201 and 202 respectively are suffixed with "1" and "2". These suffixes are omitted in the case of the phase currents Iv, Iw and mechanical angle θm, whose values are inputted in common to the inverter control circuits 201 and 202.

Based on the torque command trq*, the current command calculation section 21 applies data maps or equations to calculate dq-axis current commands Id1*, Iq1*. The dq conversion section 29 performs coordinate conversion of the phase currents Iv, Iw obtained by the current sensor 84 into dq-axis currents Id, Iq, by using the electrical angle θe, and the dq-axis currents Id, Iq are inputted as feedback values to the current subtractor section 22. The current subtractor section 22 calculates dq-axis current deviations ΔId1, ΔId2 between the dq-axis currents Id, Iq and the dq-axis current commands Id1*, Iq1*. The PI controller 23 executes proportional integral calculation of the feedback terms vd_fb1, vq_fb1 of the dq-axis voltage commands such as to reduce the dq-axis current deviations ΔId1, ΔId2 towards zero.

The feedforward calculation section 24 calculates feedforward terms vd_ff1, vq_ff1 of the dq-axis voltage commands using equation (1) below, based on the dq-axis current commands Id1*, Iq1* and the MG rotation speed ω. In equation (1) R is the winding resistance, Ld, Lq are dq-axis self-inductance values, and φ is a back-EMF voltage constant. It would be equally possible to use the converted actual dq-axis currents from the dq conversion section 29 in place of the dq-axis current commands Id1*, Iq1*. Furthermore the equipment constants could be set as variable values, for enabling the effects of temperature characteristics, etc., to be compensated.

$$vd = R \times Id - \omega \times Lq \times Iq$$

$$vq = R \times Iq - \omega \times Ld \times Id + \omega \times \phi \quad (1)$$

The voltage command summing section 25 adds the feedback terms vd_fb1, vq_fb1 and the feedforward terms vd_ff1, vq_ff1 to obtain dq-axis voltage command values vd1, vq1 and outputs these to the 3-phase AC conversion section 27. In each of successive calculation operations, the 3-phase AC conversion section 27 converts the dq-axis voltage commands vd1, vq1 to u, v, w axis voltage commands vu1, vv1, vw1, using the electrical angle θe. The three series of voltage command values thereby outputted from the 3-phase AC conversion section 27, corresponding to the u,v,w phases respectively, are inputted to the modulator 28 together with the detected DC power source voltages VH1, VH2. The modulator 28 performs PWM (Pulse Width Modulation) of a carrier wave based on the voltage commands vu1, vv1, vw1 and the DC power source voltages VH1, VH2, to generate gate signals UU1, UL1, VU1, VL1, WU1, WL1 corresponding to the u, v and w phases respectively. These gate signals are applied to the gate electrodes (i.e., control electrodes) of the switching elements 61~66 of the first inverter 60, to control the first inverter 60.

The configuration and operation of the second inverter control circuit 202 in controlling the second inverter 70 are as follows, being basically identical to those of the first inverter control circuit 201. However in the case of the second inverter control circuit 202, the mechanical angle θm obtained from the rotation angle sensor 85 is inverted by a signal inversion circuit 86, and the result is converted to an electrical angle θe-180° by an electrical angle calculation section 87. Hence, in receiving the DC source voltages VH1, VH2 and the voltage commands vu2, vv2, vw2 and generating PWM gate signals UU2, UL2, VU2, VL2, WU2, WL2 that are applied to the switching elements 7176 of the second inverter 70, the modulator 28 of the second inverter control circuit 202 executes PWM that is inverted relative to that of the first inverter control circuit 201. As a result, the 3-phase voltages VU1, VV1, VW1 generated by the first inverter 60 are of opposite polarity to the 3-phase voltages VU2, VV2, VW2 generated by the second inverter 70.

If the second inverter control circuit 202 is to execute a (pure) feedforward control method, the control section 200 sets each of the feedback terms vd_fb1, vq_fb1 to zero for that control circuit, so that only the feedforward terms vd_ff1, vq_ff1 are utilized in generating the voltage commands vu2, vv2, vw2 which are inputted to the modulator 28 of the second inverter control circuit 202.

In the following, closed-loop control that is pure feedback control, or a combination of feedback control and feedforward control (as shown for the first inverter control circuit 201 in FIG. 3) is referred to in general as feedback control (FB) while "feedforward control (FF)" refers to pure feedforward control.

As described above, the related prior art technology such as that of reference 1 does not take into consideration the effects of differing characteristics of microcomputers, sensors, etc., which may result in control interference and unstable operation.

However with the present invention, the respective control methods executed by the inverter control circuits 201 and 202 are determined such as to avoid control interference. The selecting of these control methods differs in accordance with whether or not the updating timings of the voltage command produced in the inverter control circuits 201 and 202 are synchronized with the electrical angle of the motor.

The configuration and operational effects of the control section 200 are described in the following for embodiments which each have the basic system configuration shown in FIG. 3 above, but which set respectively different combinations of control methods (high-speed feedback control, low-speed feedback control, feedforward control) and of voltage command synchronization modes (synchronized or unsynchronized with the electrical angle of the MG 80), such as to avoid control interference and operation instability. The possible combinations are shown in the table of FIG. 13, described more specifically hereinafter, in which the designations *1 to *5 indicate the first to fifth embodiments respectively.

First Embodiment

A first embodiment will be described referring to FIGS. 4 to 6. With the first embodiment, each of the inverter control circuits 201 and 202 updates the voltage commands at timings that are not synchronized with the electrical angle θe of the MG 80. That operating mode of an inverter control circuit is referred to in the following as "angle non-synchronized control", while a mode in which the update timings are synchronized with the electrical angle of the MG 80 is referred to as "angle synchronized control". The voltage commands of the first inverter control circuit 201 and second inverter control circuit 202 are outputted as gate control signals to the first drive circuit 67 and second drive circuit 77 respectively, for controlling the output voltages of the first inverter 60 and second inverter 70. With this embodiment, angle non-synchronized control and sinusoidal PWM are executed by each of the inverter control circuits 201, 202. The voltage command update timings (i.e., timings of updating the vu1, vv1, vv1 voltage commands from the 3-phase AC conversion section 27) have a prescribed period between successive timings, being synchronized with the PWM carrier wave as a timing reference.

In the following, feedback control in which the updating period of the voltage commands is of the order of 200 microseconds is referred to as high-speed feedback control.

Figure 4:
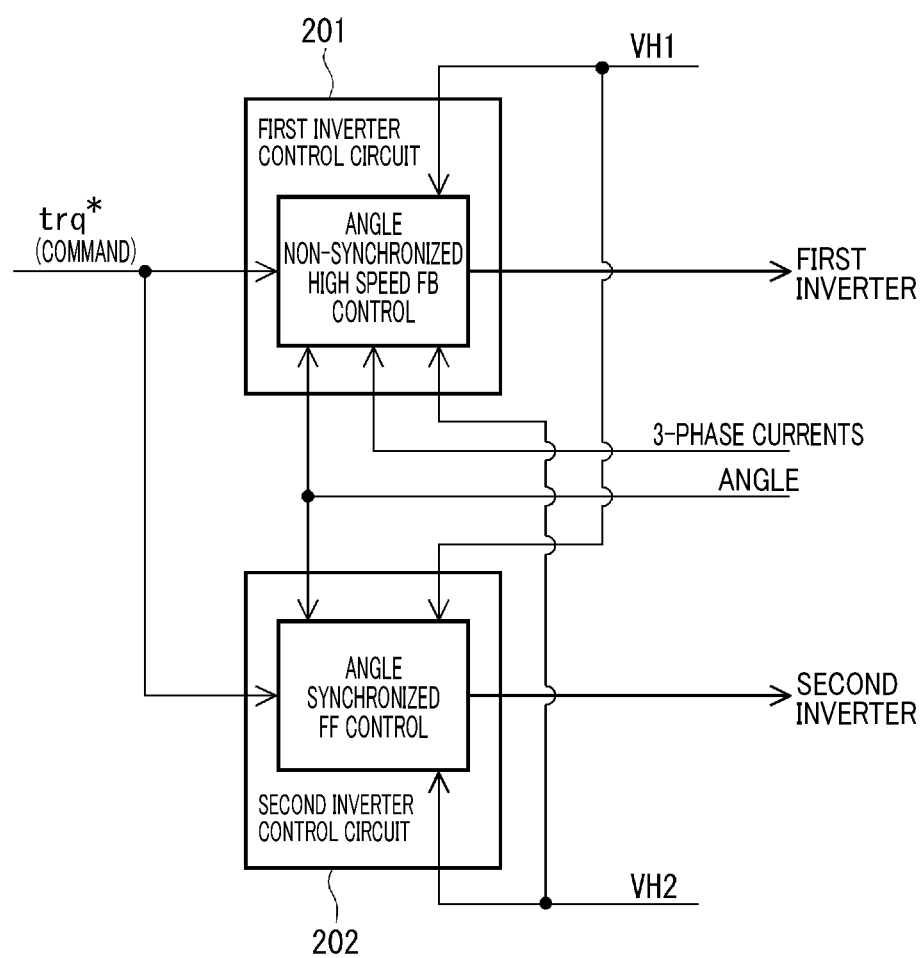
FIG. 4 is a general configuration diagram illustrating an inverter control method applied with a first embodiment.

The general configuration diagram of FIG. 4 shows only the input and output signals of the inverter control circuits 201 and 202 of the first embodiment, and respective control methods that are set for these inverter control circuits. Similar diagrams illustrating each of the other embodiments are described in the following. In FIG. 4 "FB" denotes feedback control, "FF" denotes feedforward control. Since the inverter control circuits 201 and 202 have the same basic configuration as described above, the inputs of the first inverter control circuit 201 and the second inverter control circuit 202 may be changed over from the condition shown in FIG. 4. This is also true for each of the other embodiments described in the following.

If both of the inverter control circuits 201 and 202 execute angle non-synchronized control of the voltage commands for the first inverter 60 and the second inverter 70, and both also execute high-speed feedback control, then control interference can arise due to the above-described causes (disparities in sensor values that are fed back, disparities in timings of updating the voltage commands, etc.). However in the case of feedforward control, the update timings of the voltage commands are uniquely determined based on the dq-axis current commands (Id1*, Idq*) and on the rotation speed w of the MG 80. Hence with this embodiment, one of the inverter control circuits executes high-speed feedback control, while the other inverter control circuit is set to execute feedforward control.

In that control configuration, a basic control quantity is determined by feedforward control executed by one of the inverter control circuits, while an insufficiency of the control provided by the feedforward control is compensated by the feedback control which is executed by the other inverter control circuit. It has been found that this combination of control methods enables control interference to be avoided while also enabling the torque produced by the MG 80 to quickly follow changes in the command value of torque.

Such a configuration is effective in all cases where control interference may arise due to the control section 200 being configured using a plurality of microcomputers, or due to variations in the characteristics of devices such as sensors, etc. This is also true for each of the other embodiments described in the following.

Figure 5:
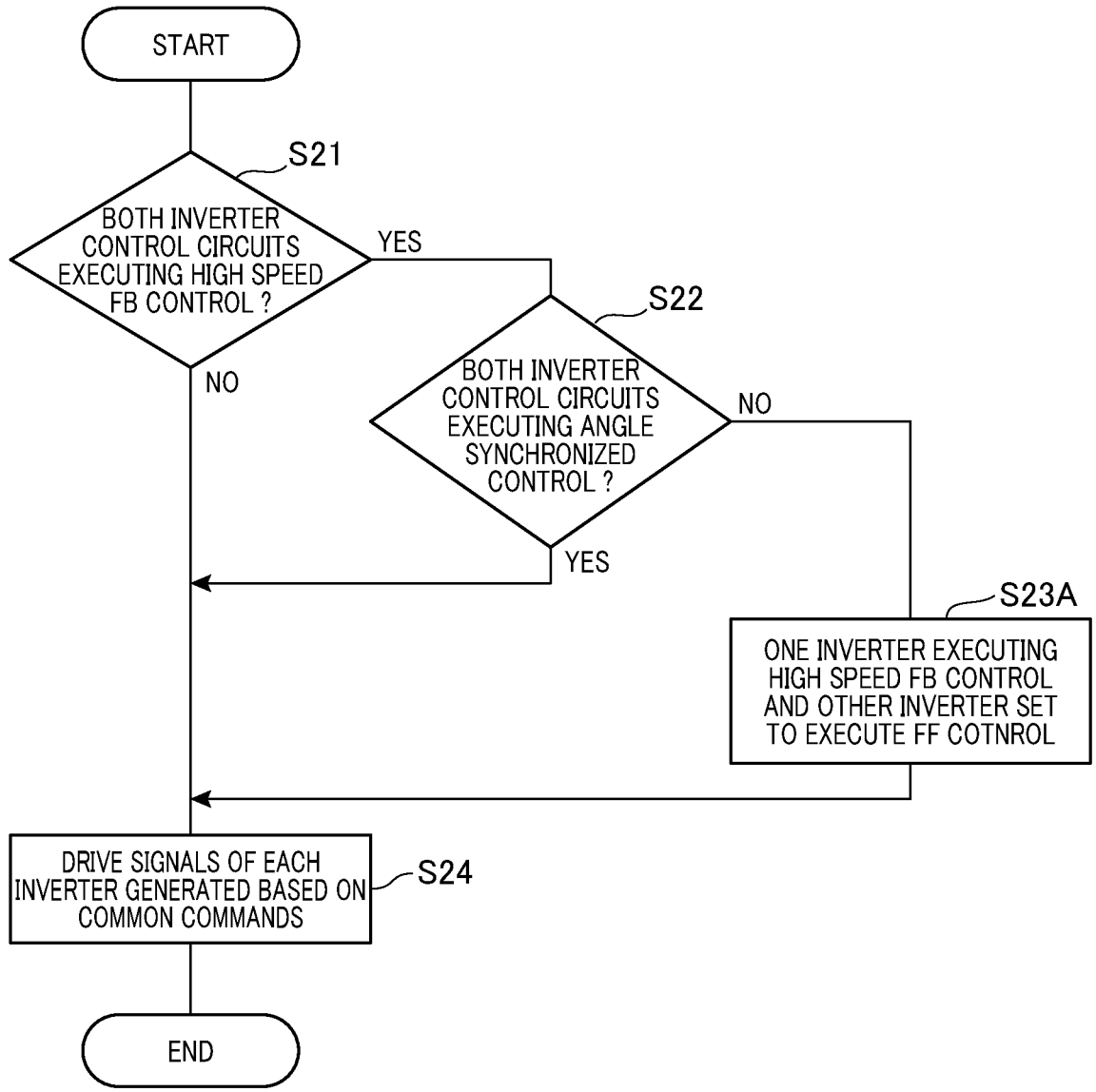
FIG. 5 is a flow diagram of processing that is executed by the control section of the first embodiment.

FIG. 5 is a flow diagram of processing executed by the control section 200 of the first embodiment, for setting the respective control methods of the inverter control circuits 201 and 202 such as to prevent control interference. In the diagram, "S" signifies a processing step. In S21 a decision is made as to whether each of the control methods of the inverter control circuits 201 and 202 is high-speed feedback control. That judgement can be made by determining whether both of the inverter control circuits 201 and 202 are executing feedback control with the same feedback control period (same updating period of the voltage commands). For example if both of the inverter control circuits 201 and 202 are applying an updating period of 200 microseconds, then a YES decision is made in S21, whereas if one of the inverter control circuits applies an updating period of 100 microseconds and the other an updating period of 200 microseconds, a NO decision is made.

If there is a YES decision in S21, S22 is executed, to judge whether both of the inverter control circuits 201 and 202 are executing angle synchronized feedback control. If there is a NO decision in S21 or a YES decision in S22 then the processing advances to S24. If there is a YES decision in S21 and a NO decision in S22, that is to say if both of the inverter control circuits 201 and 202 are executing high-speed feedback control, and at least one of these inverter control circuits is applying angle non-synchronized feedback control, then step S23A is executed.

In S23A, one of the inverter control circuits 201, 202 continues to perform high-speed feedback control, while the other is set for executing feedforward control, and the processing then advances to step S24. In S24 the inverter control circuits operate in accordance with the control methods that have been respectively set for them, to drive the inverters 60 and 70 based on the torque command and sensor detection values that are supplied in common to both control circuits.

The effects obtained by the first embodiment will be described referring to FIG. 6, in which the upper diagram illustrates occurrence of control interference and the lower diagram illustrates prevention of the control interference by the operation of the first embodiment. Values of time are plotted along the horizontal axis and inverter output power along the vertical axis. It is assumed that respective values of output voltage of the two inverter control circuits are successively increased from a starting time point to. So long as the output voltage of an inverter control circuit is less than a specific value Mx, referred to in the following as the changeover value, that inverter control circuit is set to execute angle non-synchronized control of the voltage command update timings, while if the output voltage reaches Mx, a changeover is made to angle synchronized control.

If angle non-synchronized control is executed, with sinusoidal PWM and overmodulation (i.e., the PWM modulation index can exceed 1) then assuming that the angle synchronized control is rectangular-wave control, the changeover value Mx could correspond to a modulation index of 1.27 for example.

Figure 6:
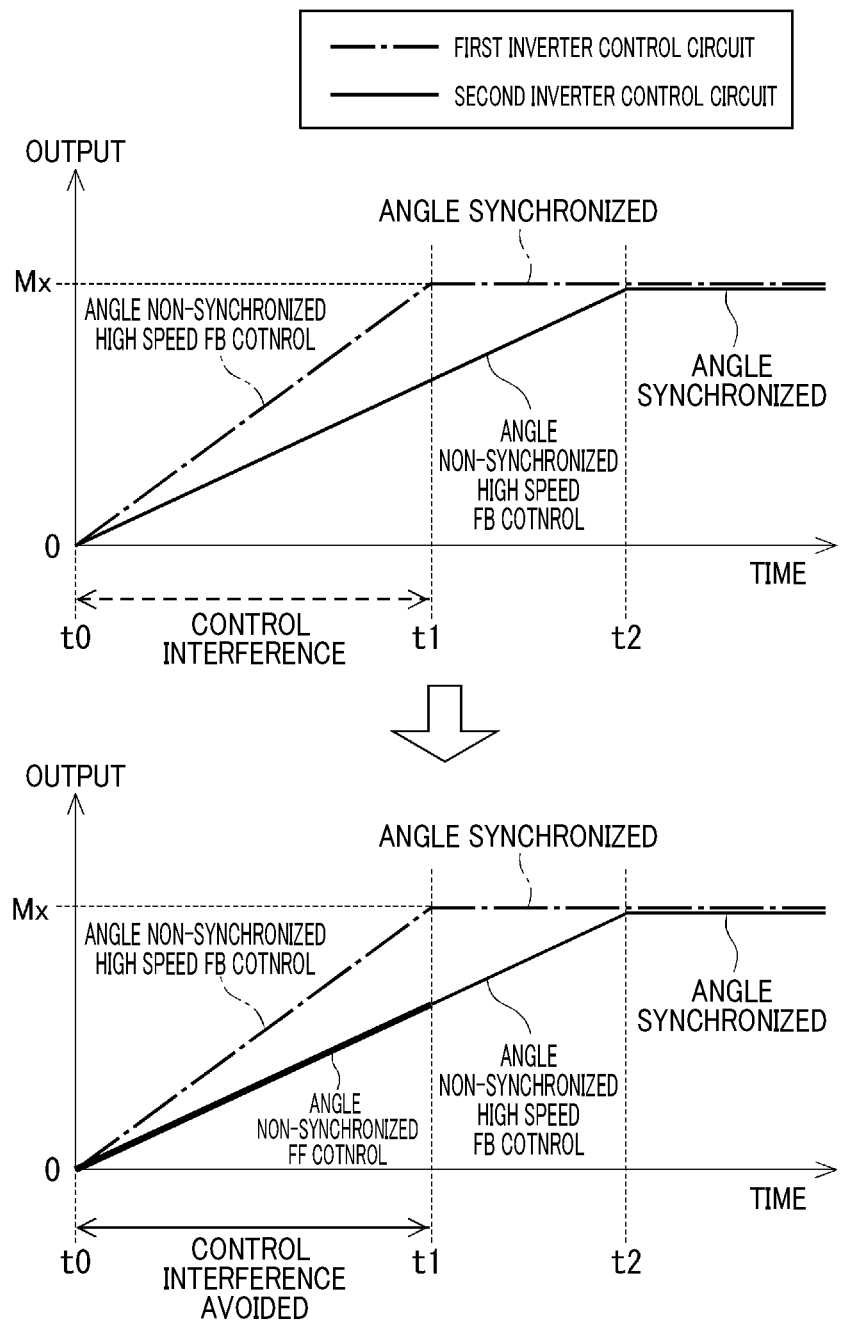
FIG. 6 is a timing diagram for describing effects obtained by the first embodiment.

In the example of FIG. 6, when the output voltage of the first inverter control circuit 201 reaches the changeover value Mx at time point t1, that inverter control circuit 201 is changed over from angle non-synchronized control to angle synchronized control. When the output voltage from the second inverter control circuit 202 subsequently reaches Mx, at time point t2, the operation of that inverter control circuit is similarly is changed over from angle non-synchronized control to angle synchronized control. The upper diagram of FIG. 6 shows the case in which both of the inverter control circuits 201, 202 execute high-speed feedback control in the interval from time point t0 to t1. The lower part of FIG. 6 illustrates the operation of this embodiment for suppressing control interference, whereby the first inverter control circuit 201 is set to execute high-speed feedback control in the interval from time point t0 to t1 while the second inverter control circuit 202 is set to execute feedforward control in that interval.

The interval from time point t0 to t1 corresponds to a condition in control interference can arise if both of the inverter control circuits are executing high-speed feedback control and also angle non-synchronized control. Hence with the first embodiment as shown in the lower part of FIG. 6, one of the inverter control circuits is set to executes high-speed feedback control from time point t0 to t1 but the other inverter control circuit is set for executing feedforward control. As a result, control interference is prevented. Moreover since at least one of the inverter control circuits executes high-speed feedback control, the output torque of the MG 80 can rapidly follow changes in the command value of torque, and disturbances can be suppressed.

Second Embodiment

Figure 7:
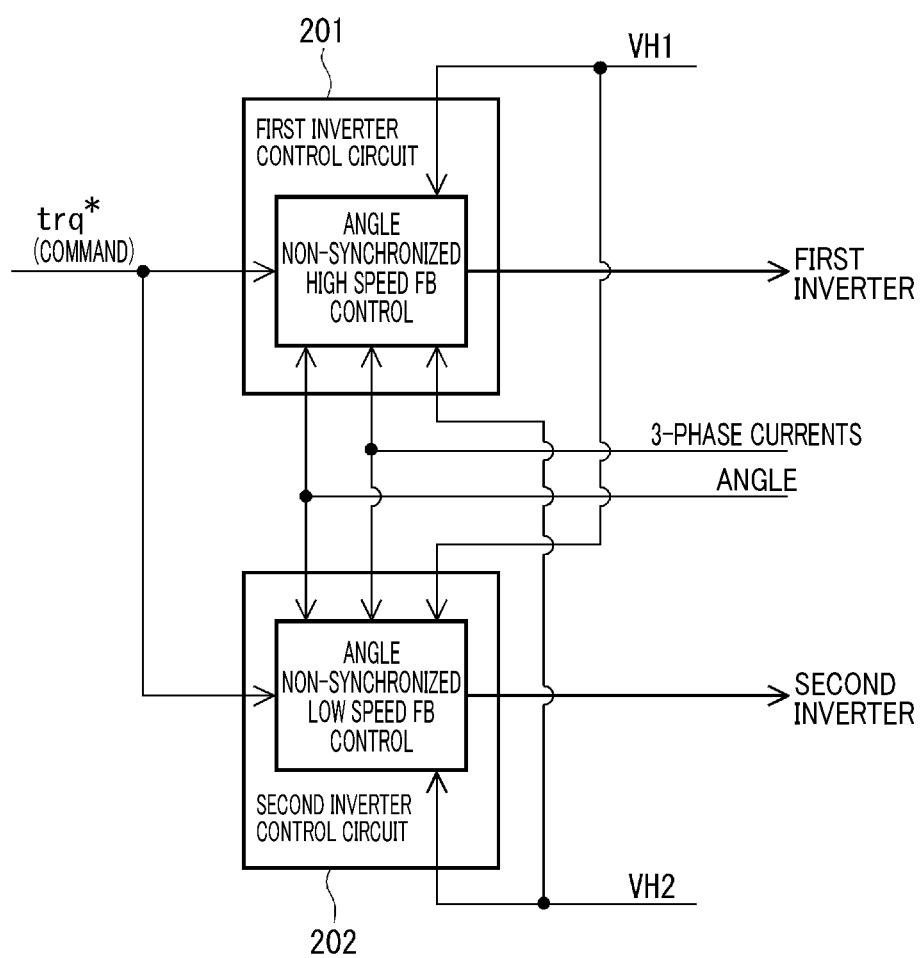
FIG. 7 is a general configuration diagram illustrating an inverter control method applied with a second embodiment.

A second embodiment will be described referring to FIGS. 7 to 9. With the second embodiment, as for the first embodiment, angle non-synchronized control of voltage commands is executed for the inverters 60 and 70. However as shown in FIG. 7, while one inverter control circuit (with this example, the first inverter control circuit 201) is set to execute high-speed feedback control, the other inverter control circuit is set to execute low-speed feedback control, for preventing control interference.

Here, "high-speed feedback control" and "low-speed feedback control" are defined relatively, i.e., with high-speed feedback control, the updating period of the voltage commands is relatively short while with "low-speed feedback control" the updating period is relatively long. For example with high-speed feedback control, the updating period might be 200 microseconds, and might be 2 milliseconds in the case of low-speed feedback control. The effect of a changeover from high-speed feedback control to low-speed feedback control is to produce a lowering of response speed, referred to as "reaction slowdown" in the following.

Changeover to low-speed feedback control of an inverter may be achieved by lengthening the repetition period of control computations relative to that of high-speed feedback control. Alternatively the control computation period may be kept unchanged, but with "thinning out" of the calculated values of the voltage commands. For example if the control computation period is set as 200 microseconds, but only 1 out of every 10 successive calculation results are applied as updated voltage command values during low-speed feedback control, this has the effect of lowering the updating period of the voltage commands during low-speed feedback control to 2 milliseconds.

As a further alternative, a reaction slowdown may be implemented by lowering the feedback gain.

With this second embodiment, disturbances are substantially suppressed due to the low-speed feedback control that is executed by one of the inverter control circuits, while a lowering of control response speed due to the low-speed feedback control is compensated by the high-speed feedback control that is executed by the other inverter control circuit. Hence the output torque of the motor can closely follow changes in the command value of torque, while control interference is prevented.

Figure 8:
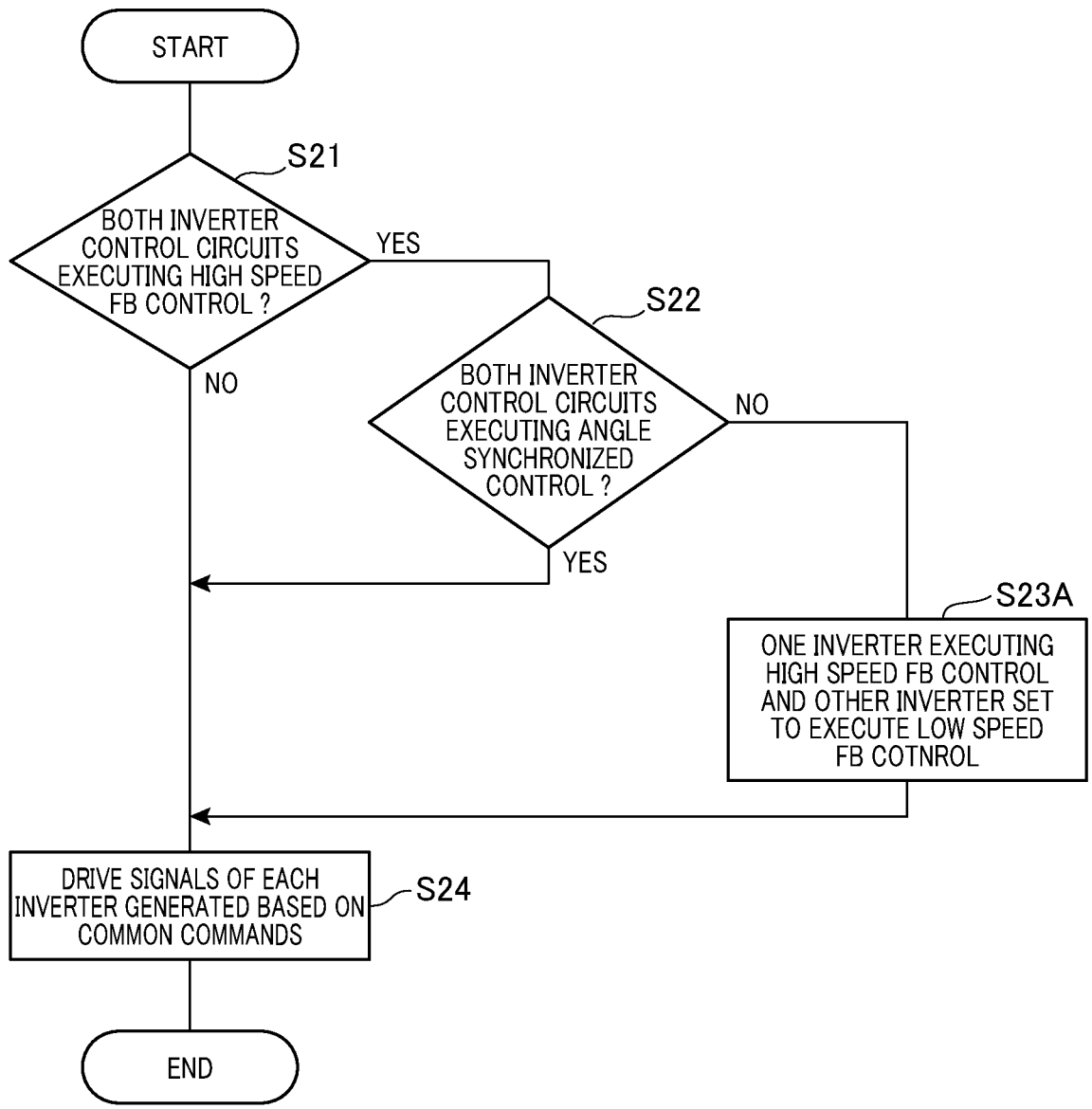
FIG. 8 is a flow diagram of processing that is executed by the control section of the second embodiment.

The flow diagram of FIG. 8 shows a control sequence executed by the control section 200 in the case of the second embodiment. This differs from the control sequence executed with the first embodiment, in that S23A of FIG. 5 is replaced by S23B. As a result of S23B, one of the inverter control circuits 201, 202 executes high-speed feedback control while the other inverter control circuit is set to execute low-speed feedback control. Specifically when S23B is executed, high-speed feedback control of one of the inverter control circuits is maintained, with the voltage command updating period left unchanged, while the voltage command updating period of the other inverter control circuit is made several times longer.

The effects obtained with the second embodiment will be described referring to FIG. 9. The upper part of FIG. 9 illustrates the case in which both of the inverter control circuits 201, 202 are set to execute angle non-synchronized control with high-speed feedback control. It is assumed that each of the inverter control circuits 201, 202 performs voltage command updating at timings synchronized with the peak timings of the PWM carrier of that inverter control circuit, and that the respective PWM carriers of the inverter control circuits 201, 202 have deviated from a condition of mutual synchronization. This could for example be caused by differing characteristics of devices such as integrated circuits that constitute the respective inverter control circuits, and causes a resultant deviation between the respective update timings of voltage commands generated by the two inverter control circuits, and may also result in a difference between the respective periods of these update timings. As described above, such a circumstance may result in control interference, with a divergence of torque and/or output voltage.

Figure 9:
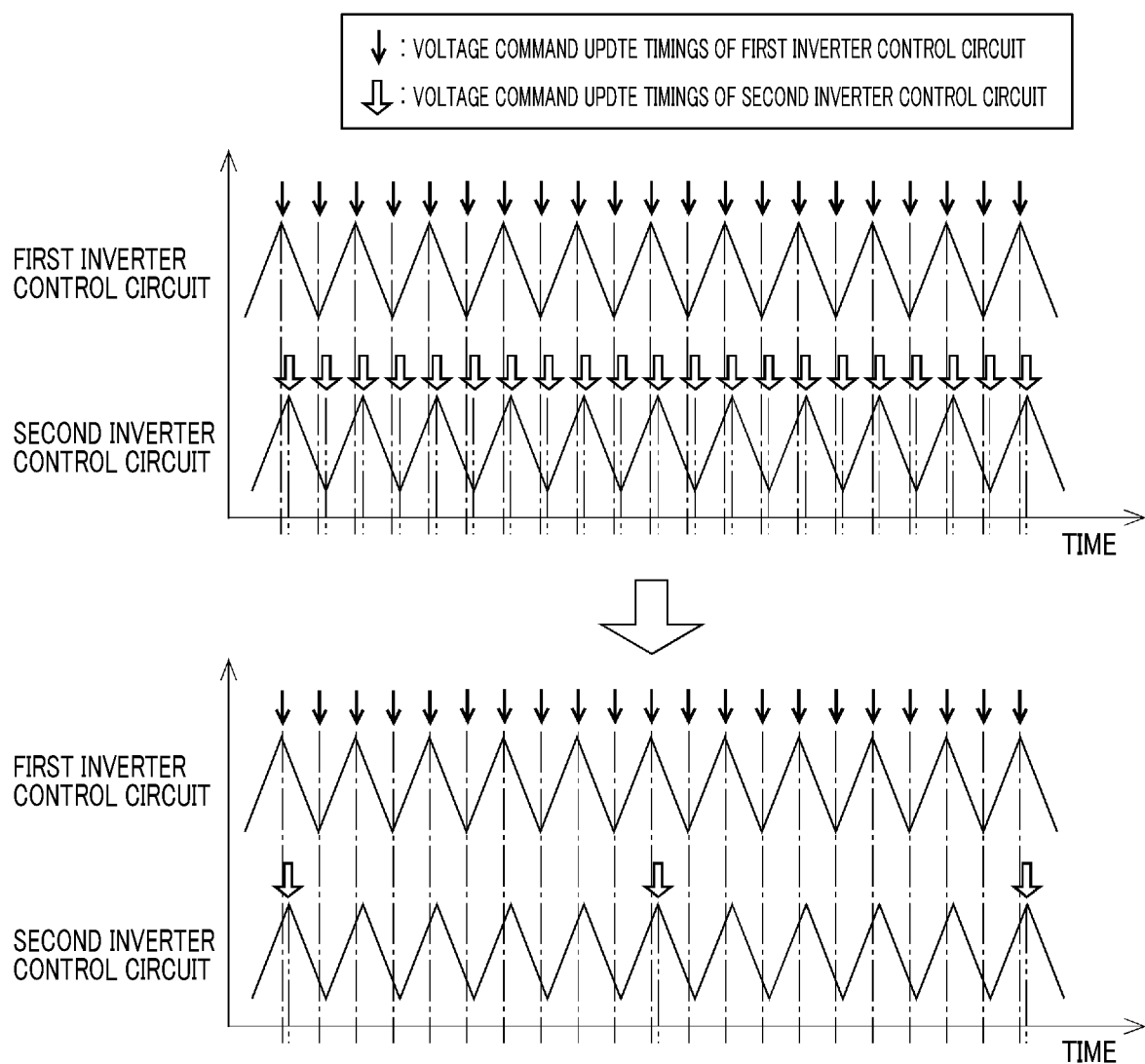
FIG. 9 is a timing diagram for describing effects obtained by the second embodiment.

The corresponding operation of the second embodiment is illustrated in the lower part of FIG. 9. In this case, the first inverter control circuit 201 executes high-speed feedback control whereas the second inverter control circuit 202 executes low-speed feedback control. In this example the changeover from high-speed feedback control to low-speed feedback control is performed by "thinning out" of voltage command update timings, i.e., the voltage command update timings of the second inverter control circuit 202 correspond to only 1 in every 5 of the peak timings of the PWM carrier waveform.

With this embodiment, the low-speed feedback control can suppress control interference sufficiently for preventing that interference from affecting the high-speed feedback control, and prevents divergence. Furthermore since at least one of the inverter control circuits executes high-speed feedback control, the torque produced by the motor can rapidly follow variations in the command value of torque, and disturbances can be suppressed.

Third to Fifth Embodiments

Third to fifth embodiments will be described referring to FIGS. 10 to 12. With these embodiments, both of the inverter control circuits 201, 202 execute angle synchronized control, i.e., the inverter control circuits generate voltage commands, for controlling the inverters 60 and 70 respectively, that are updated at timings synchronized with the electrical angle θe of the MG 80. An example of such angle synchronized control is rectangular wave control, in which a single rectangular-wave pulse is produced in each period of the electrical angle and the update timings of the voltage commands are synchronized with these pulses.

Figure 10:
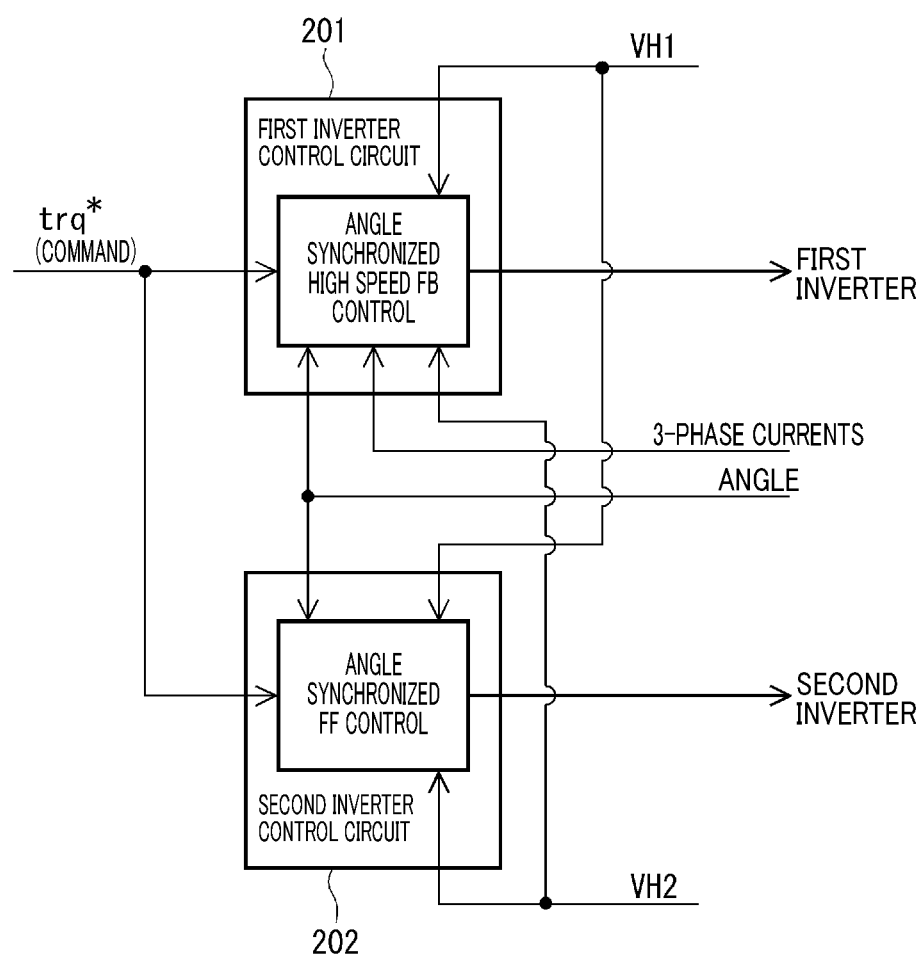
FIG. 10 is a general configuration diagram illustrating an inverter control method applied with the control section of a third embodiment.
Figure 11:
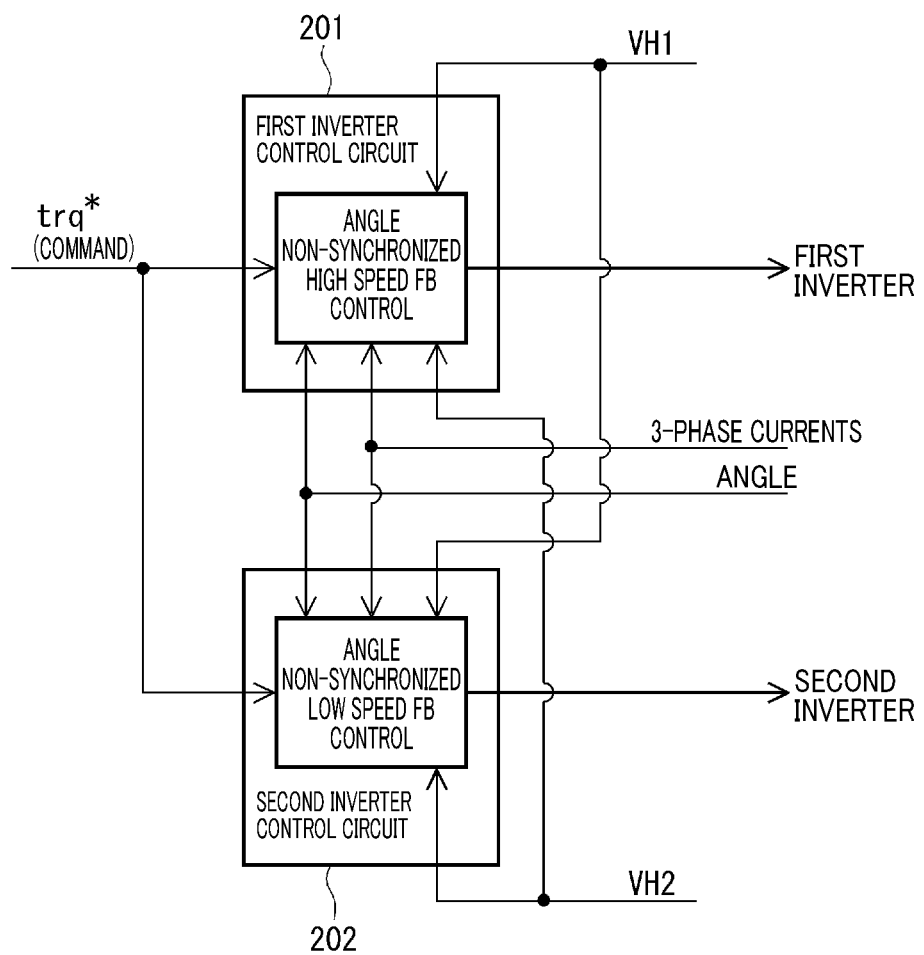
FIG. 11 is a general configuration diagram illustrating an inverter control method applied with a fourth embodiment.

The general configuration of the inverter control circuits of the third embodiment is shown in FIG. 10. As with the first embodiment, one of the inverter control circuits (here, inverter control circuit 201) executes high-speed feedback control, while the other is set to execute feedforward control. In the case of the fourth embodiment as shown in FIG. 11, as with the second embodiment, one of the inverter control circuits (here, inverter control circuit 201) executes high-speed feedback control, while the other inverter control circuit is set to execute low-speed feedback control.

The third and fourth embodiments can provide the same effects as for the first and second embodiments, each of which apply angle non-synchronized control.

Figure 12:
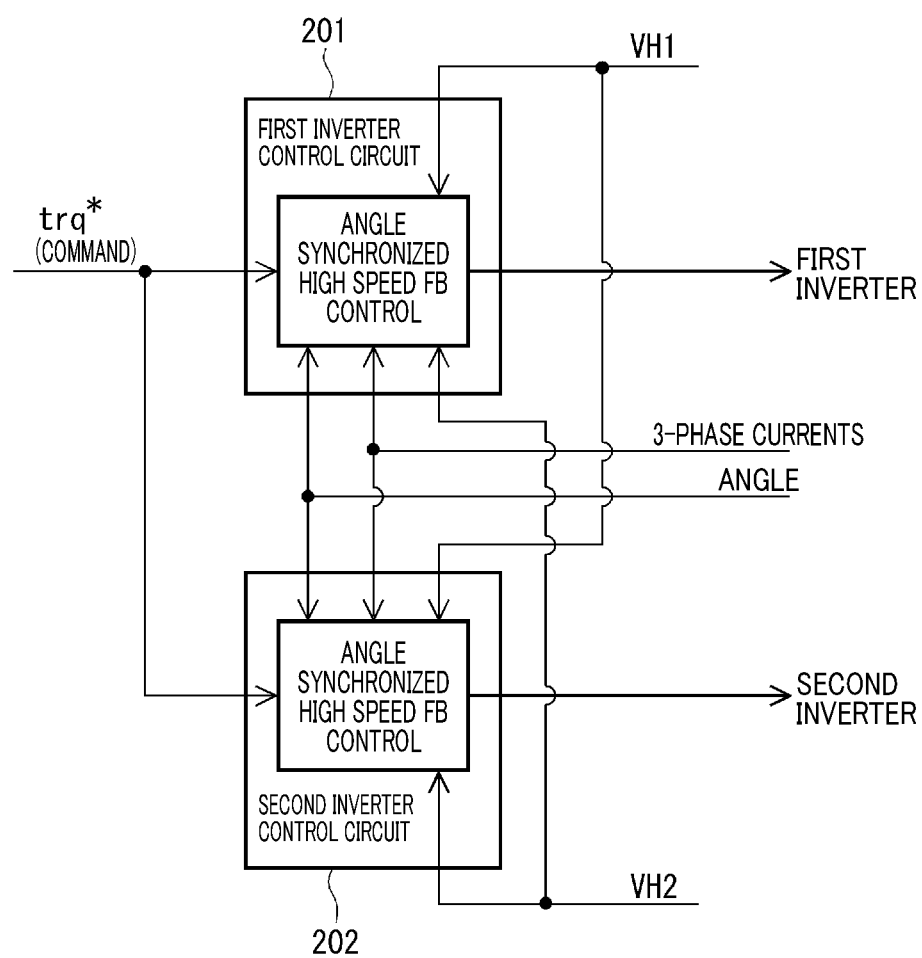
FIG. 12 is a general configuration diagram illustrating an inverter control method applied with a fifth embodiment.

With the fifth embodiment, both of the inverter control circuits 201 and 202 execute high-speed feedback control, with angle synchronized control of the voltage command update timings, as shown in FIG. 12. As described above, if both of the inverter control circuits execute high-speed feedback control and angle non-synchronized control of the inverters 60 and 70 (i.e., of the respective voltage command update timings for these inverters) then control interference may be produced and present a danger of divergence, due to factors such as disparities in the characteristics of sensors and microcomputers. With this embodiment, both of the inverter control circuits execute angle synchronized control, and feedback control based on detected values of phase current which are common to each of them, while respective voltage commands generated by the inverter control circuits are updated at timings synchronized with the electrical angle of the MG 80. As a result, although both of the inverter control circuits execute high-speed feedback control, control interference can be prevented even if there are disparities in the characteristics of devices such as microcomputers and sensors in the inverter control circuits.

Hence with this embodiment, a rapid response to changes in the command value of torque can be achieved, together with effective suppression of disturbances and stability of driving the MG 80.

Other Embodiments (a) FIG. 13 shows a matrix diagram of the various combinations of feedback/feedforward control modes (high-speed feedback control, low-speed feedback control, feedforward control) that can be executed by the inverter control circuits 202, 202 and control modes (angle synchronized control, angle non-synchronized control) that can be applied for updating the command voltages of the inverters 60 and 70. In FIG. 13 the symbol "O" indicates a combination whereby control interference will not be produced, and the symbol "x" indicates a combination for which there is a danger that control interference will arise. The symbols (*1) to (*5) indicate the first to fifth embodiments respectively. As shown, if both of the inverter control circuits 201, 202 execute angle non-synchronized control and also both execute high-speed feedback control, there will be a danger of control interference.

Furthermore as shown for the combinations within the hatched-line region in FIG. 13, (other than when both of the inverter control circuits execute angle non-synchronized control and low-speed feedback control) the MG 80 can be driven without danger of control interference, with each inverter control circuit executing angle non-synchronized control or angle synchronized control, if each of the inverter control circuits 201, 202 executes low-speed feedback control or each executes feedforward control, or they execute a combination of low-speed feedback control and feedforward control. However in such a case, the control effectiveness of the overall system will become weak, and the effectiveness of suppressing disturbances will become low. In spite of this, such combinations may be satisfactory for applications in which the motor will be driven at a substantially constant speed and in which suppression of disturbances is not a requisite.

(b) It would be equally possible for both of the inverters 60 and 70 to be supplied in common from a single DC power source. Furthermore in the case in which two respectively independent power sources are utilized, it is not essential for each of these to be a secondary cell such as a rechargeable battery or a capacitor. For example one of the DC power sources could be a secondary cell and the other could be a fuel cell or an electric generator.

(c) The number of phases of the motor is not limited to 3, and the invention would be equally applicable to driving a synchronous motor having 4 or more phases. Furthermore the invention would be equally applicable to driving a 2-phase motor having open-end windings of respective phases connected in a bridge configuration.

(d) A dual power source, dual-inverter type of motor drive is suitable for application to a wide range of vehicle types. These extend from pure electric vehicles such as electric automobiles, fuel cell vehicles, etc., and hybrid power train vehicles that are electrically powered to a large degree such as PHVs (Plug-in Hybrid Vehicles) and range-extender vehicles, to vehicles that are only moderately electrified, e.g., 12~48 V ISG (Integrated Starter Generator) vehicles. A motor drive apparatus according to the present invention, based on inverter circuit topology, enables a high efficiency to be achieved in a wide range of operating regions, for use with such varied types of vehicle. It has been found difficult to obtain such results by using conventional types of voltage booster (boost converter) circuit, whose operation is based on switching the current flow in an inductor.

It should be noted that the present invention is not limited to the above embodiments, and may be implemented in various forms that do not depart from the scope of the invention as set out in the appended claims.

What is claimed is:

1. A motor drive apparatus for controlling driving of a synchronous motor having two or more armature windings corresponding to respective phases, each armature winding having an open configuration with a first end and a second end thereof unconnected to the ends of other ones of the armature windings, the motor drive apparatus comprising:
    a first inverter having a plurality of first switching elements, with each of the first switching elements connected to the first end of a corresponding one of the armature windings;
    a second inverter having a plurality of second switching elements, with each of the second switching elements connected to the second end of a corresponding one of the armature windings; and
    a control section having:
        a first inverter control circuit configured to generate first voltage commands based on an externally supplied torque command value and to generate voltage control signals for the first inverter in accordance with the first voltage commands; and
        a second inverter control circuit configured to generate second voltage commands based on the torque command value and to generate voltage control signals for the second inverter in accordance with the second voltage commands,
    wherein the control section is configured to: cause the first inverter control circuit to execute high-speed feedback control whereby an updating period of the voltage commands generated by the first inverter control circuit is made shorter than that of the second inverter control circuit; and cause the second inverter control circuit to execute low-speed feedback control whereby the updating period of the voltage commands generated by the second inverter control circuit is made longer than that of the first inverter control circuit, so as to avoid control interference generated respectively within the first inverter control circuit and the second inverter control circuit, the control interference resulting from one or more of a set of causes that include at least:
        i) deviations between update timings of the voltage commands generated by the first inverter control circuit and the second inverter control circuit respectively,
        ii) deviations between generating timing of the first voltage commands and generating timing of the voltage control signals for the first inverter, and
        iii) deviations between generating timing of the second voltage commands and generating timing of the voltage control signals for the second inverter.

2. The motor drive apparatus according to claim 1, wherein each of the first inverter control circuit and the second inverter control circuit executes angle non-synchronized control whereby the voltage commands generated by the first inverter control circuit and the second inverter control circuit are non-synchronized with respect to values of electrical angle attained by the motor.

3. The motor drive apparatus according to claim 1, wherein at least one of the first inverter control circuit and the second inverter control circuit executes angle synchronized control whereby the voltage commands generated by the first inverter control circuit and the second inverter control circuit are updated at timings synchronized with values of electrical angle attained by the motor.

4. The motor drive apparatus according to claim 1, wherein each of the first inverter control circuit and the second inverter control circuit executes angle synchronized control whereby the voltage commands generated by the first inverter control circuit and the second inverter control circuit are updated at timings synchronized with values of electrical angle attained by the motor, with an updating period of the voltage commands being identical for both of the first inverter control circuit and the second inverter control circuit.

5. The motor drive apparatus according to claim 1, wherein:
    each of the first inverter control circuit and the second inverter control circuit generates voltage control signals by PWM (Pulse Width Modulation) based on the voltage commands generated by each of the first inverter control circuit and the second inverter control circuit,
    at least one of the first inverter control circuit and the second inverter control circuit executes angle non-synchronized control whereby the voltage commands generated by one of the first inverter control circuit and the second inverter control circuit are asynchronous with respect to values of electrical angle attained by the motor, and
    in executing the angle non-synchronized control, the voltage commands generated by one of the first inverter control circuit and the second inverter control circuit are updated at timings synchronized with a carrier wave that is utilized in the PWM.

6. The motor drive apparatus according to claim 1 wherein respective functions of the control section for generating the first voltage commands and the second voltage commands are implemented at least in part by a microcomputer in executing a program that has been stored beforehand in a non-volatile recording medium.

* * * * *